United States Patent [19]

Shek

[11] 4,403,123

[45] Sep. 6, 1983

[54] PEDAL MOUNTED SWITCHING ASSEMBLY

[75] Inventor: Thompson Shek, Newton, Mass.

[73] Assignee: Ark-Les Corporation, Watertown, Mass.

[21] Appl. No.: 337,147

[22] Filed: Jan. 5, 1982

[51] Int. Cl.³ .............................................. H01H 3/14
[52] U.S. Cl. ................................ 200/61.89; 200/86.5; 200/153 C
[58] Field of Search ............... 200/61.89, 86.5, 153 C, 200/61.29, 61.90; 340/70, 71; 315/80

[56] References Cited

U.S. PATENT DOCUMENTS

| | | | |
|---|---|---|---|
| 1,562,803 | 11/1925 | Stone | 200/61.29 |
| 1,641,099 | 8/1927 | Schuster et al. | |
| 1,643,230 | 9/1927 | Williams | 200/86.5 |
| 2,435,389 | 2/1948 | Good | 200/59 |
| 2,674,669 | 4/1954 | Leedam | 200/86.5 |
| 2,707,214 | 4/1955 | Kaleba et al. | 200/61.89 |
| 2,750,462 | 6/1956 | Milster | 200/61.89 |
| 2,769,043 | 10/1956 | Ulinski | 200/86.5 |
| 2,822,441 | 2/1958 | Fortney | 200/86.5 |
| 2,831,367 | 4/1958 | Reilly | 74/513 |
| 2,946,870 | 7/1960 | Brown | 200/61.89 |
| 3,024,327 | 3/1962 | Van Meter | 200/61.29 |
| 3,514,623 | 6/1970 | Ballard | 307/10 |
| 3,911,394 | 10/1975 | Shames | 340/71 |
| 3,912,892 | 10/1975 | Morehouse | 200/61.89 |
| 3,921,750 | 11/1975 | Shames | 180/103 |

Primary Examiner—A. T. Grimley
Assistant Examiner—Morris Ginsburg

[57] ABSTRACT

A switching assembly for mounting on a pedal has a flat shaped switch actuator constrained to move with a single degree of freedom in a plane parallel to the pedal face. A pressure member at the front of the pedal receives a control force from an operator and as it moves toward the pedal face moves the switch actuator through a cam linkage. The cam linkage includes cam surface extending close to the periphery of the pressure member so that the cam action is effective irrespective of the area of the pressure member pressed by an operator. The switching assembly is effective in changing switch settings of a plurality of switches in a predetermined order as the pedal is pressed irrespective of the point of application of control force to the pressure member.

3 Claims, 6 Drawing Figures

U.S. Patent    Sep. 6, 1983    4,403,123
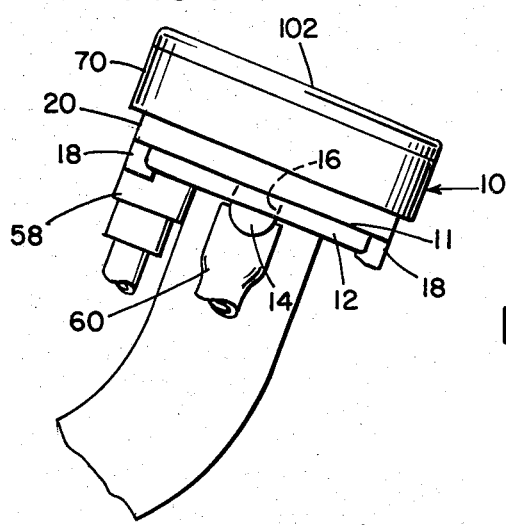
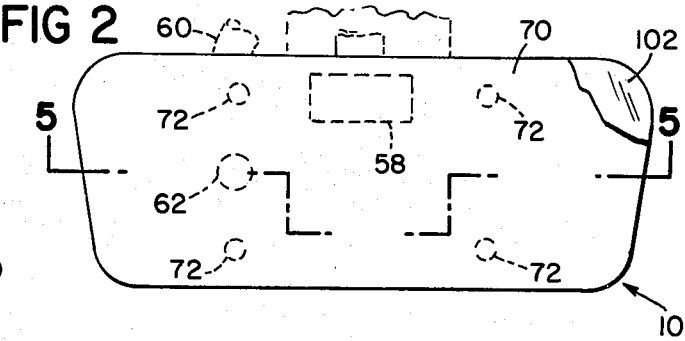
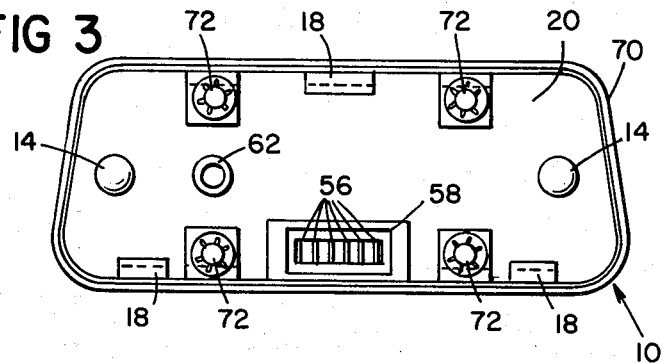
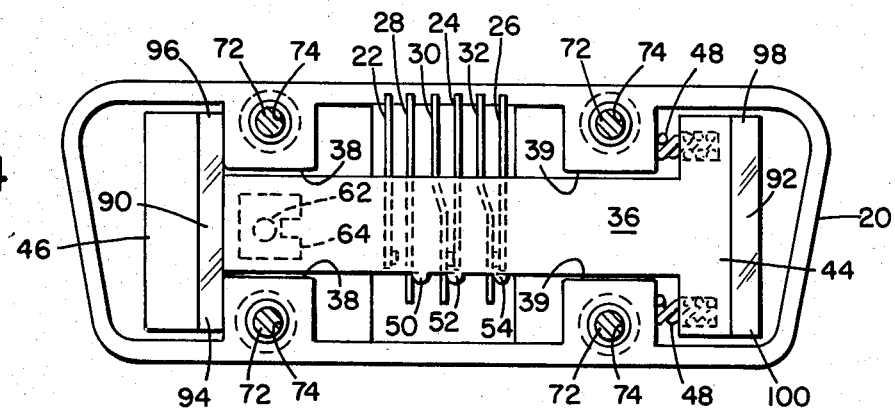
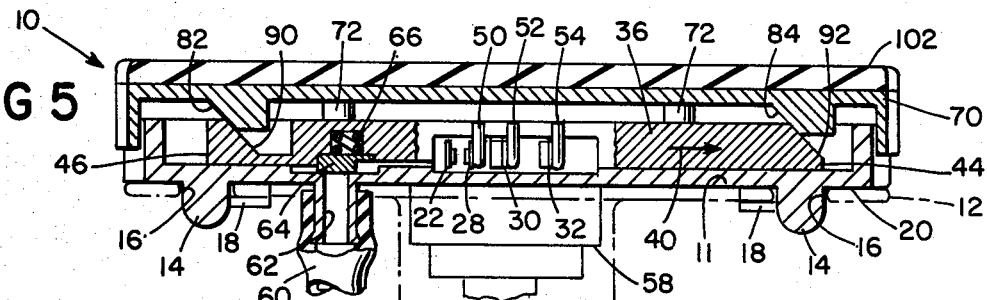
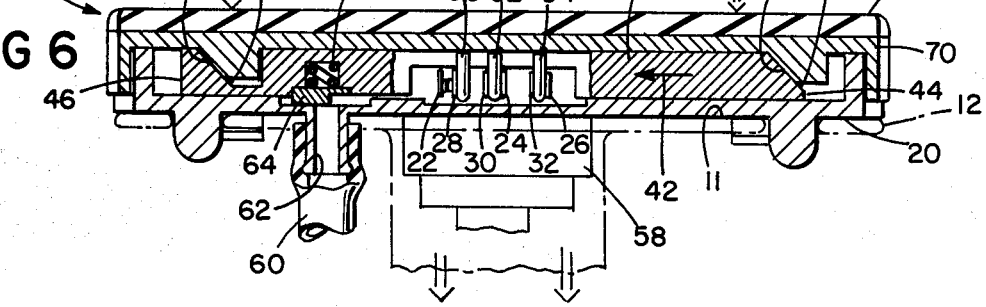

PEDAL MOUNTED SWITCHING ASSEMBLY

This invention relates to switching effected incidentally to operation of a control pedal.

Switching assemblies for use on the top face of pedals must be in a flat package. The member which receives the foot pressure sometimes binds or hits a constraint before accomplishing the switching. Conventional switching assemblies are also unsatisfactory in that when used to operate a plurality of switches they sometimes operate one switch first and sometimes another.

SUMMARY OF THE INVENTION

The invention features a switching assembly for mounting on the face of a pedal to effect switching when said pedal is pressed comprising a generally flat base adapted for attachment to a pedal, a plurality of movable switching elements supported ultimately on the base, each of the switching elements arranged to assume a plurality of positions to implement distinct switch settings. The assembly includes a generally flat shaped actuator supported on the base and constrained to move backward and forward with a single degree of freedom in a plane parallel to the pedal face, the actuator having actuating means arranged for moving the movable switching elements as the actuator moves forward, and a cam surface positioned and arranged so that pressing thereon urges the actuator to move forward.

A resilient element is arranged to urge said actuator backwards and a generally flat pressure member is supported on the base in a manner permitting motion of the pressure member toward and away from the pedal face while constraining motion parallel to the pedal. The pressure member is adapted for receiving control pressure applied by an operator to the pedal and has cam surface positioned and arranged so that when control pressure is applied to the pressure member by an operator the pressure member cam surface presses on the actuator cam surface to urge the actuator forward.

The switching assembly is effective in changing switch settings of the switching elements in a well defined predetermined order as the pedal is pressed irrespective of the point of application of control pressure on the pressure member.

The invention may additionally feature cam surface extending to areas close to the periphery of the pressure member so that the cam action is effective irrespective of the area of the pressure member pressed by an operator and a pressure member loosely supported on the base to permit motion of the pressure member toward the pedal without binding irrespective of the area pressed by an operator.

BRIEF DESCRIPTION OF THE DRAWING

FIG. 1 shows a brake pedal and portion of a shaft with switching assembly according to the invention attached thereto.

FIG. 2 shows the switching assembly of FIG. 1 viewed from the face side.

FIG. 3 shows the assembly of FIG. 2 from the bottom.

FIG. 4 shows at somewhat larger scale the assembly of FIG. 2 with the upper pressure member removed to reveal hidden parts.

FIG. 5 shows a cut away side view of the assembly of FIG. 2 cut on the section shown in FIG. 2, the assembly being in its normal position.

FIG. 6 shows the same view as FIG. 5, the assembly being in position it assumes when pressed.

DESCRIPTION OF EMBODIMENTS

Referring to the drawing, switching assembly 10 according to the invention is mounted on the face 11 of brake pedal 12 with protuberances 14 of assembly 10 fitting into holes 16 of pedal 12 and flexible snap locks 18 gripping the edge of pedal 12.

Assembly 10 includes base 20 which supports protuberances 14 and snap locks 18. Stationary electrical switching elements 22, 24, 26 and corresponding movable switching elements 28, 30, 32 are affixed to base 20. Actuator 36, having a generally flat shape, is supported in base 20 and constrained by bosses 38 and 39 to move in a plane parallel to pedal face 11 with a single degree of freedom forward, (i.e. in direction of arrow 42) or backward, (i.e. in direction of arrow 40). The forward travel of actuator 36 is limited by the impinging of broad portion 44 on bosses 39, while the backward travel is limited by the impingement of broad portion 46 on bosses 38. Springs 48 act as resilient elements urging actuator 36 in the backward direction.

Stationary electrical switching elements 22, 24, 26 and corresponding movable switching elements 28, 30, 32 are affixed to base 20. Actuating fingers 50, 52, 54, extending from actuator 36 engage movable switching elements 28, 30, 32 respectively and change the switch settings when actuator 36 moves from its backward to its forward position and returns the settings when actuator 36 resumes its backward position. Switching elements 22, 24, 26, 28, 30, 32 are connected to connector elements 56 in connector 58 to which electrical circuits to be controlled by the switching assembly may be connected.

Pneumatic vacuum line 60 is connected to pneumatic port 62 in base 20. Elastomeric sealing element 64 is lodged in a cavity in actuator 36 and moves with actuator 36. It acts as a switching element for the vacuum line, by blocking and sealing port 62 when actuator 36 is in its backward position (arrow 40) while permitting air to enter when actuator 36 is in its forward position (arrow 42). Spring 66 maintains pressure for a good contact between sealing element 64 and port 62.

Generally flat pressure member 70 is supported on base 20 by retaining pins 72 which permit motion of pressure member 70 towards and away from pedal face 11. Pins 72 fit loosely in pinways 74 in base 20 so that pressure member 70 will move without binding when an operator presses on it. Pressure member 70 generally covers base 20 and has cam surface which as shown in FIGS. 5 and 6 is in two portions 82 and 84. The cam surface 82, 84 of pressure member 70 engages mating cam surface on actuator 36, also in two portions 90, 92, so that motion of pressure member 70 toward pedal face 11 forces actuator 36 in the forward direction (as indicated by arrow 42). The mating cam surfaces advantageously include areas 94, 96, 98, 100 near the periphery of pressure member 70 so that the movement of actuator 36 by pressure member 70 is effective irrespective of what area of pressure member 70 is pressed by an operator. Elastomeric pad 102 is affixed to and covers the top surface of pressure member 70.

To accomplish installation, the switching assembly is clipped securely to a brake pedal, being positioned by protuberances 14 fitting into holes 16 in pedal 12 and secured by snap locks 8. Pneumatic equipment to be controlled by the switch assembly is connected to port 62 through line 60 and electrical equipment to be controlled is connected to connecting elements 56 in connector 58.

In operation, an operator presses his foot on the pad 102 as he begins the braking operation. The initial pressure moves pressure member 70 toward pedal face 11 and operates the switch assembly; further motion of the operator's foot depresses the pedal and operates the brake mechanism.

More specifically, the initial pressure on pressure member 70 presses cam surface 82, 84 against cam surface 90, 92 with the effect that actuator 36 is moved forward (i.e. in direction of arrow 42). While the detailed motion of pressure member 70 is somewhat variable depending on what particular area is pressed by the operator's foot, the motion of actuator 36 is well defined because it is constrained to move with a single degree of freedom by bosses 38 and 39. The motion of actuator 36 effects the movement of switching elements—(both electrical and pneumatic) to new positions thereby implementing a change in switch settings of the several switches. Because the actuator moves in a well defined manner with one degree of freedom, the order of effecting setting changes in the several switches is invariable and independent of the position on the pressure member pressed by the operator.

When the operator removes his foot from the pedal, the actions described above are reversed, with springs 48 moving actuator 36 backward (arrow 40) and cam surface 90, 92 pressing on cam surface 82, 84 to effect lifting of pressure member 70 away from pedal face 11.

What is claimed is:

1. A switching assembly for mounting on the face of a pedal to effect switching when said pedal is pressed comprising:

a generally flat base adapted for attachment to a pedal, a plurality of movable switching elements supported ultimately on said base, each of said switching elements arranged to assume a plurality of positions to implement distinct switch settings, a generally flat shaped actuator supported on said base and constrained to move backward and forward with a single degree of freedom in a plane parallel to said pedal face, said actuator having actuating means arranged for moving said movable switching elements as said actuator moves forward and releasing said switching elements as said actuator moves backward, said actuator having a cam surface positioned and arranged so that pressing thereon urges said actuator to move forward, a resilient element arranged to urge said actuator backward, a generally flat pressure member supported on said base in a manner permitting motion of the pressure member toward and away from said pedal face while constraining motion parallel to said pedal, said pressure member being adapted for receiving control pressure applied by an operator to said pedal and having cam surface positioned and arranged so that when control pressure is applied to said pressure member by an operator said pressure member cam surface presses on said actuator cam surface to urge said actuator forward, said switching assembly being effective in changing switch settings of said plurality of switching elements in a predetermined order as said pedal is pressed irrespective of the point of application of control pressure on said pressure member.

2. An assembly as claimed in claim 1, said actuator cam surface and said pressure member cam surface extending to areas close to the periphery of said pressure member, whereby cam action is effective irrespective of the area of the pressure member which is pressed by an operator.

3. An assembly as claimed in claim 2, said pressure member being supported loosely on said base so that motion of said pressure member towards said pedal can occur without binding, irrespective of the area of the pressure member pressed by an operator.

* * * * *